United States Patent
Huang et al.

(10) Patent No.: US 9,009,139 B2
(45) Date of Patent: Apr. 14, 2015

(54) QUERY PIPELINE

(75) Inventors: Wei Huang, Fremont, CA (US); Yizheng Zhou, Cupertino, CA (US); Bin Yu, San Ramon, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 64 days.

(21) Appl. No.: 13/699,953

(22) PCT Filed: Jun. 10, 2011

(86) PCT No.: PCT/US2011/040011
§ 371 (c)(1),
(2), (4) Date: Nov. 26, 2012

(87) PCT Pub. No.: WO2011/156731
PCT Pub. Date: Dec. 15, 2011

(65) Prior Publication Data
US 2013/0073573 A1    Mar. 21, 2013

Related U.S. Application Data

(60) Provisional application No. 61/353,559, filed on Jun. 10, 2010.

(51) Int. Cl.
*G06F 17/30* (2006.01)

(52) U.S. Cl.
CPC .................. *G06F 17/30563* (2013.01)

(58) Field of Classification Search
CPC .................. G06F 17/30422; G06F 17/30448; G06F 17/30454
See application file for complete search history.

(56) References Cited

U.S. PATENT DOCUMENTS

| | | | |
|---|---|---|---|
| 6,009,265 A * | 12/1999 | Huang et al. | 707/999.003 |
| 7,472,112 B2 | 12/2008 | Pfleiger et al. | |
| 2003/0229640 A1 * | 12/2003 | Carlson et al. | 707/100 |
| 2007/0283194 A1 * | 12/2007 | Villella et al. | 714/57 |
| 2008/0189277 A1 * | 8/2008 | Meijer et al. | 707/6 |
| 2009/0157623 A1 | 6/2009 | Bedi et al. | |
| 2009/0254916 A1 | 10/2009 | Bose et al. | |
| 2009/0319498 A1 | 12/2009 | Zabokritski et al. | |

* cited by examiner

*Primary Examiner* — Khanh Pham
(74) *Attorney, Agent, or Firm* — Mannava & Kang P.C.

(57) ABSTRACT

A query pipeline is created (514) from a query request. The query pipeline includes multiple query operations including multiple query operators. A first query operator and a second query operator perform first and second query operations on a database (526) and on data outside the database (534). A result from the first query operation in the query pipeline is fed to the second query operation in the query pipeline.

14 Claims, 6 Drawing Sheets

QUERY PIPELINE

PRIORITY

The present application claims priority to U.S. Provisional Patent Application Ser. No. 61/353,559, filed Jun. 10, 2010, which is incorporated by reference in its entirety.

BACKGROUND

Network security management is generally concerned with collecting data from network devices that reflects network activity and operation of the devices, and analyzing the data to enhance security. For example, the data can be analyzed to identify an attack on the network or a network device, and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a network device. Examples of network devices include firewalls, intrusion detection systems, servers, switches, routers, etc.

Each message or log file entry is stored for future use. The stored messages or log file entries may be queried to identify information relevant to the attack or analysis. To facilitate the searching of the messages or log file entries, the data may be stored in a relational database. Upon receiving the queries, the relational database may identify and return relevant messages or log files. The returned messages or log files may be processed (e.g., filtered or sorted) and then presented to a user.

The relational database is capable of handling a large amount of data. However, the relational database can perform certain types of queries but not others. Hence, a user must carefully craft query operators and conditions to be compatible with the relational database. In some occasions, the user may have to perform subsequent processing on a query result obtained from the relational database to obtain a desired result. Moreover, the relational database often requires access to a slower secondary storage device (e.g., hard disk) in order to perform a query.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF EMBODIMENTS

According to an embodiment, a computer system is for collecting data from disparate devices across a computer network, normalizing the data to a common schema, and consolidating the normalized data. The data ("events") can then be monitored, analyzed, and used for investigation and remediation in a centralized view. Events can be cross-correlated with rules to create meta-events. Correlation includes, for example, discovering the relationships between events, inferring the significance of those relationships (e.g., by generating metaevents), prioritizing the events and meta-events, and providing a framework for taking action. The system (one embodiment of which is manifest as machine readable instructions executed by computer hardware such as a processor) enables aggregation, correlation, detection, and investigative tracking of suspicious network activities. The system also supports response management, ad-hoc query resolution, reporting and replay for forensic analysis, and graphical visualization of network threats and activity.

Embodiments also include a logging system that generates a sequence of query operations which involves at least one query operation on a relational database and at least one query operation based on stream processing. The logging system receives a query request and identifies query operations to be performed on the relational database and query operations to be performed by stream processing. The query operations for the relational database are converted into SQL (structured query language) commands and are provided to the relational database. The logging system receives query results from the relational database and performs subsequent query operations based on the relational database or stream processing. The logging system leverages the capability of the relational database to handle a large amount of data and the flexibility of the stream processing to perform various types of query commands.

Stream processing described herein refers to performing multiple operations on a stream of data in a sequential manner within primary data storage. In stream processing, processed data from an earlier operation are fed to a subsequent operation for processing sequentially.

The system is described with respect to examples, which should not be read to limit the broader spirit and scope of the embodiments. For example, the examples presented herein describe distributed agents, managers and consoles, which are but one embodiment. The general concepts and reach are much broader and may extend to any computer-based or network-based security system. Also, examples of the messages that may be passed to and from the components of the system and the data schemas that may be used by components of the system are given, but are not meant to be all-inclusive examples and should not be regarded as such.

Figure 1:
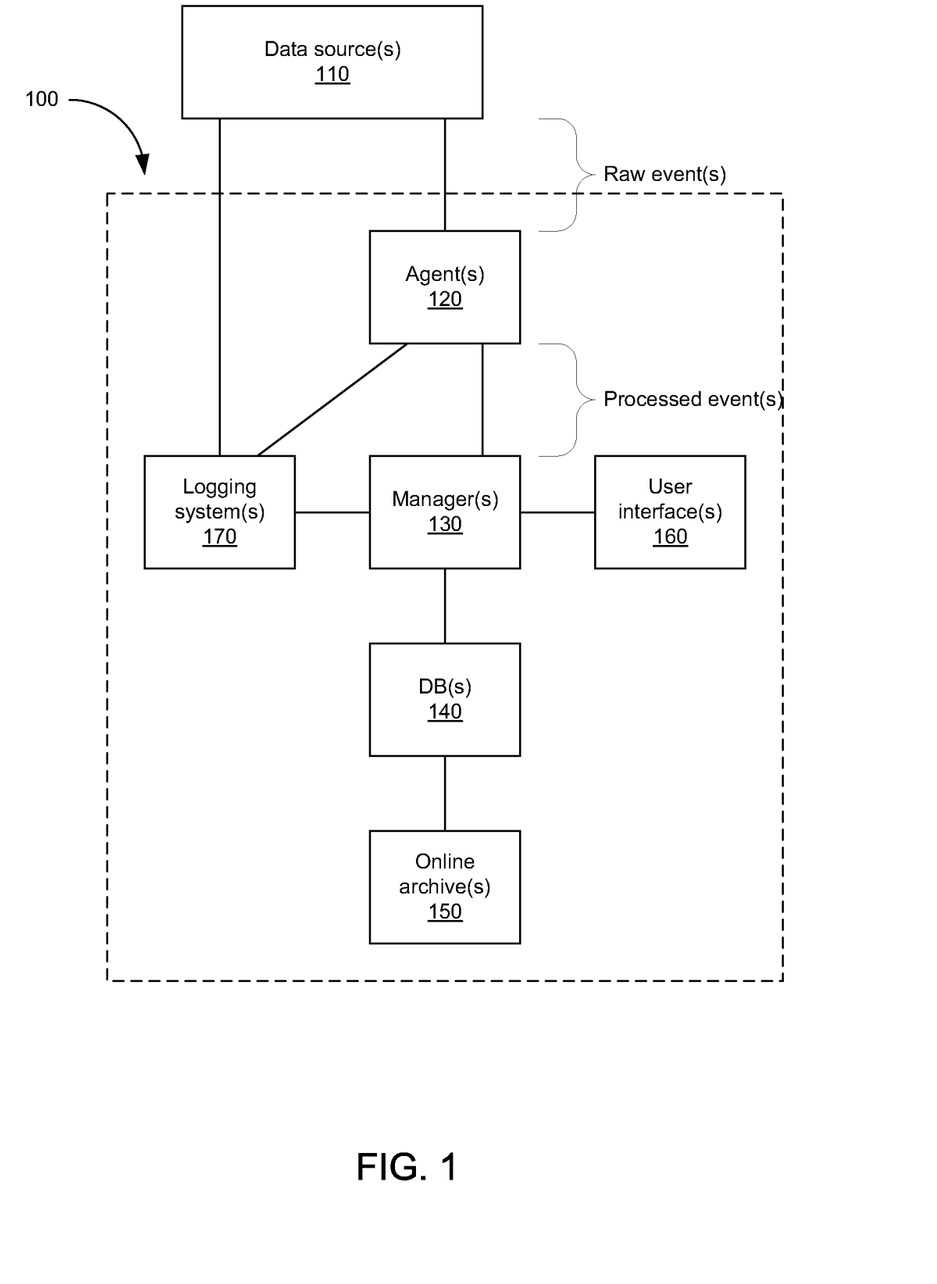
FIG. 1 is a block diagram illustrating an environment having a security information and event management system, according to one embodiment.

FIG. 1 is a block diagram illustrating an environment having a security information and event management system, according to one embodiment. FIG. 1 includes a security information and event management (SIEM) system 100 and one or more data sources 110. A data source 110 is a network node, which can be a device or a software application. Examples of data sources 110 include intrusion detection systems (IDSs), intrusion prevention systems (IPSs), vulnerability assessment tools, firewalls, anti-virus tools, anti-spam tools, encryption tools, application audit logs, and physical security logs.

Types of data sources 110 include security detection and proxy systems, access and policy controls, core service logs and log consolidators, network hardware, encryption devices, and physical security. Examples of security detection and proxy systems include IDSs, IPSs, multipurpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network hardware includes routers and switches. Examples of encryption devices include data security and integrity. Examples of physical security systems include card-key readers, biometrics, burglar alarms, and fire alarms.

The SIEM system 100 includes one or more agents 120, one or more managers 130, one or more databases 140, one or more online archives 150, one or more user interfaces 160, and one or more logging systems 170. In some embodiments, these modules are combined in a single platform or distributed in two, three, or more platforms (such as in FIG. 1). The use of this multi-tier architecture supports scalability as a computer network or system grows.

An agent 120 provides an interface to a data source 110. For example, the agent 120 collects data ("raw events") from a data source 110, processes the data, and sends the processed data ("events") to a manager 130. The agent 120 can operate anywhere, such as at a separate device communicating via a protocol such as simple network management protocol (SNMP) traps, at a consolidation point within the network, or at the data source 110. For example, if the data source 110 is a software application, the agent 120 can be co-hosted on the device that hosts the data source.

Processing can include normalization, aggregation, and filtering. For example, individual raw events are parsed and normalized for use by the manager 130. Normalization can involve normalizing values (such as severity, priority, and time zone) into a common format and/or normalizing a data structure into a common schema. Events can be categorized using a common, human-readable format. This format makes it easier for users to understand the events and makes it easier to analyze the events using filters, rules, reports, and data monitors. In one embodiment, the common format is the Common Event Format (CEF) log management standard from ArcSight, Inc.

Aggregation and filtering reduce the volume of events sent to the manager 130, which saves network bandwidth and storage space, increases the manager's efficiency and accuracy, and reduces event processing time. The agent 120 sends events to the manager 130 in batches based on the expiration of a time period or based on a threshold number of events being reached.

The agent 120 can also send commands to the data source 110 and/or execute commands on the local host, such as instructing a scanner to run a scan. These actions can be executed manually or through automated actions from rules and data monitors. The agent 120 can also add information to the data that it has collected, such as by looking up an Internet Protocol (IP) address and/or hostname in order to resolve IP/hostname lookup at the manager 130.

The agent 120 is configured via an associated configuration file (not shown). The agent 120 can include one or more software modules including a normalizing component, a time correction component, an aggregation component, a batching component, a resolver component, a transport component, and/or additional components. These components can be activated and/or deactivated through appropriate commands in the configuration file. During configuration, the agent 120 is registered to the manager 130 and configured with characteristics based on its data source 110 and desired behavior. The agent 120 is further configurable through both manual and automated processes. For example, the manager 130 can send to the agent 120 a command or configuration update.

The manager 130 provides analysis capabilities, case management workflow capabilities, and services capabilities. Communications between the manager 130 and the agent 120 can be bi-directional (e.g., to enable the manager 130 to transmit a command to the platform hosting the agent 120) and encrypted. In some installations, the manager 130 can act as a concentrator for multiple agents 120 and can forward information to other managers 130 (e.g., managers deployed at a corporate headquarters). To perform its tasks, the manager 130 uses a variety of filters, rules, reports, data monitors, dashboards, and network models. In one embodiment, the manager 130 is a Java-based server.

Analysis can include detection, correlation, and escalation. For example, the manager 130 cross-correlates the events received from the agents 120 using a rules engine (not shown), which evaluates each event with network model and vulnerability information to develop realtime threat summaries. Regarding case management, the manager 130 can maintain reports regarding the status of security incidents and their resolution. Services can include administration, notification, and reporting. The manager 130 can also provide access to a knowledge base.

As events are received by the manager 130, they are stored in a database 140. Storing the events enables them to be used later for analysis and reference. In one embodiment, the database 140 is a relational database management system.

In one embodiment, the database 140 stores data in partitions, which are chronological slices of the database. For example, one new partition is created each day to store that day's events. A partition can be compressed and stored in an online archive 150 for later retrieval. In one embodiment, partition management is provided by the SmartStorage archiving and retrieval component of the Security Lifecycle Information Management (SLIM) product from ArcSight, Inc.

A user interacts with the manager 130 via a user interface 160. The user interface 160 enables the user to navigate the features and functions of the manager 130. A single manager 130 can support multiple user interface instances. The features and functions that are available to the user can depend on the user's role and permissions and/or the manager's configuration. In one embodiment, access control lists enable multiple security professionals to use the same manager 130 and database 140 but each professional has his own views, correlation rules, alerts, reports, and knowledge bases appropriate to his responsibilities. Communication between the manager 130 and the user interface 160 is bi-directional and can be encrypted.

In one embodiment, there are two types of user interfaces 160: a workstation-based interface and a web browser-based interface. The workstation interface is a standalone software application that is intended for use by full-time security staff in a Security Operations Center (SOC) or similar security monitoring environment. The workstation interface includes an authoring tool for creating and modifying filters, rules, reports, pattern discovery, dashboards, and data monitors. The workstation interface also enables a user to administer users, database partitions, and workflow (e.g., incident investigation and reporting). For example, the workstation interface enables a user to perform routine monitoring, build complex correlation and long sequence rules, and perform routine administrative functions. In one embodiment, the workstation interface is the ESM Console product from ArcSight, Inc.

The web interface is an independent and remotely installable web server that provides a secure interface with the manager 130 for web browser clients. The web interface is intended for use as a streamlined interface for customers of Managed Service Security Providers (MSSPs), SOC operators, and users who need to access the manager 130 from outside the protected network. Because the web server can be installed at a location remote from the manager 130, the web server can operate outside the firewall that protects the manager 130. The web interface provides event monitoring and drill-down capabilities. In one embodiment, as a security feature, the web interface does not enable authoring or administrative functions. In one embodiment, the web interface is the ArcSight Web product from ArcSight, Inc.

In one embodiment, a logging system 170 is an event data storage appliance that is optimized for extremely high event throughput. The logging system 170 stores security events (sometimes referred to as "log data"). In one embodiment, the security events are stored in compressed form. However, the logging system 170 can retrieve these events on demand and restore them to their original, unmodified form, which may be used for subsequent forensics analysis. Multiple logging systems 170 can work together to scale up to support high sustained input rates when storing events. Event queries can be distributed across a peer network of logging systems 170. A user can configure the logging system 170 via a user interface (not shown).

The logging system 170 can receive both processed events (e.g., events adhering to the Common Event Format) and raw events. In one embodiment, raw events are received directly from data sources 110 (such as syslog messages and log files), and processed events are received from agents 120 or managers 130. The logging system 170 can also send both raw events and processed events. In one embodiment, raw events are sent as syslog messages (to any device; not shown), and processed events are sent to the manager 130. The logging system 170 will be further described below.

Through the above-described architecture, the SIEM system 100 can support a centralized or decentralized environment. This is useful because an organization may want to implement a single instance of the SIEM system 100 and use an access control list to partition users. Alternatively, the organization may choose to deploy separate SIEM systems 100 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. SIEM systems 100 can also be deployed in a corporate hierarchy where business divisions work separately and support a rollup to a centralized management function.

Described herein are systems and methods for storing log data efficiently while supporting querying. "Log data," as used herein, can be generated by various data sources, including both devices and applications. These sources include, for example, the data sources 110 described above as well as network systems, computers, operating systems, anti-virus systems, databases, physical infrastructure, identity management systems, directory services, system health information systems, web traffic, legacy systems, proprietary systems, mainframes, mainframe applications, security systems, physical devices, and SIEM sources (such as agents 120 and managers 130).

A system can obtain log data in many ways. For example, log data can be received (e.g., according to the syslog protocol). Alternatively, log data can be accessed (e.g., by reading a file that is stored locally or remotely). Other methods include, for example, Open Database Connectivity (ODBC), Simple Network Management Protocol (SNMP) traps, NetFlow, and proprietary Application Programming Interfaces (APIs). Log data can also be input by a user (e.g., using a command line interface (CLI)).

Log data can be in any format. One such format is CEF. Other formats are, for example, specific to the data sources 110 that generated the log data. Log data is comprised of one or more data instances called "events." An event can be, for example, an entry in a log file, an entry in a syslog server, an alert, an alarm, a network packet, an email, or a notification page. In general, an event is generated once and does not change afterwards.

In one embodiment, an event includes implicit meta-data and a message. Implicit meta-data can include information about, for example, the device or application that generated the event ("event source") and when the event was received from the event source ("receipt time"). In one embodiment, the receipt time is a date/time stamp, and the event source is a network endpoint identifier (e.g., an IP address or Media Access Control (MAC) address) and/or a description of the source, possibly including information about the product's vendor and version.

The message represents what was received from the event source and can be in any form (binary data, alphanumeric data, etc.). In one embodiment, the message is free-form text that describes a noteworthy scenario or change. In another embodiment, the message also includes explicit meta-data. Explicit meta-data is obtained, for example, by parsing the message. When an event source generates an event, the event usually includes information that indicates when the event occurred ("event occurrence time"). The event occurrence time, which is usually a date/time stamp, is an example of explicit meta-data and is frequently used for analysis. Different event sources often produce non-uniform explicit meta-data (e.g., priority or criticality of event, devices/applications/users affected by event, and which user triggered event).

In one embodiment, if an event does not include an occurrence time, an implicit timestamp generated by an event receiver when it received the event is treated as the original occurrence timestamp. As an event is processed and potentially forwarded through various systems, each system usually has an implicit notation of event receipt time.

In one embodiment, an event represents a data structure that includes one or more fields, where each field can contain a value (sometimes referred to as an "attribute"). The size of this data structure usually falls within the range of 100 bytes to 10 kilobytes.

Figure 2:
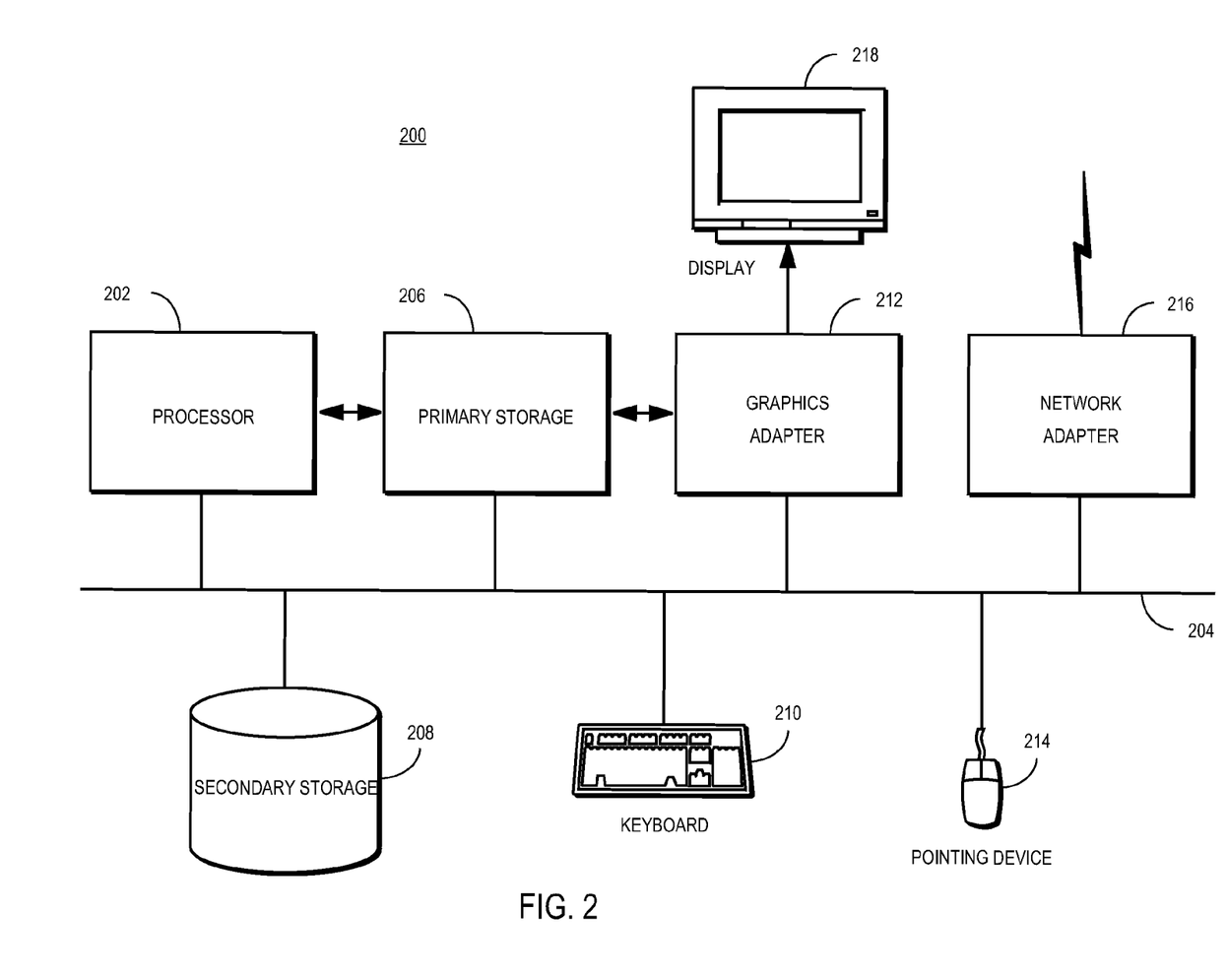
FIG. 2 is block diagram illustrating a computer for acting as a logging system of a security information and event management system, according to one embodiment.

FIG. 2 is a high-level block diagram of a computer 200 that may be used as a platform for the logging system 170 of the SIEM system 100 according to one embodiment. The computer 200 may also be used as a platform for other systems described herein. Illustrated are at least one processor 202 coupled to a bus 204. Also coupled to the bus 204 are primary storage device 206, secondary storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The secondary storage 208 is any device capable of holding data, like a hard drive, compact disk read-only memory (CD-ROM), DVD, or a solid-state memory device. The primary storage 206 holds instructions and data used by the processor 202. The primary storage 206 is often referred to simply as "memory" and may be embodied, for example, as a random-access memory (RAM). The primary storage 206 has a faster access speed but limited storage capacity compared to the secondary storage 208. Hence, operations performed with no access or limited access to the secondary storage 208 would be faster and more efficient than operations that need frequent access to the secondary storage 208.

The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, the computer 200 can have different and/or other components than those shown in FIG. 2. In addition, the computer 200 can lack certain illustrated components. For example, the computer 200 acting as a logging system 170 can lack a keyboard 210, pointing device 214, graphics adapter 212, and/or display 218. Moreover, the storage device 208 can be local and/or remote from the computer 200 (such as embodied within a storage area network (SAN)).

The computer system 200 may execute, by the processor 202 or other hardware processing circuit, the methods, functions and other processes described herein. These methods, functions and other processes may be embodied as machine readable instructions stored on computer readable medium, which may be non-transitory, such as hardware storage devices.

Figure 3A:
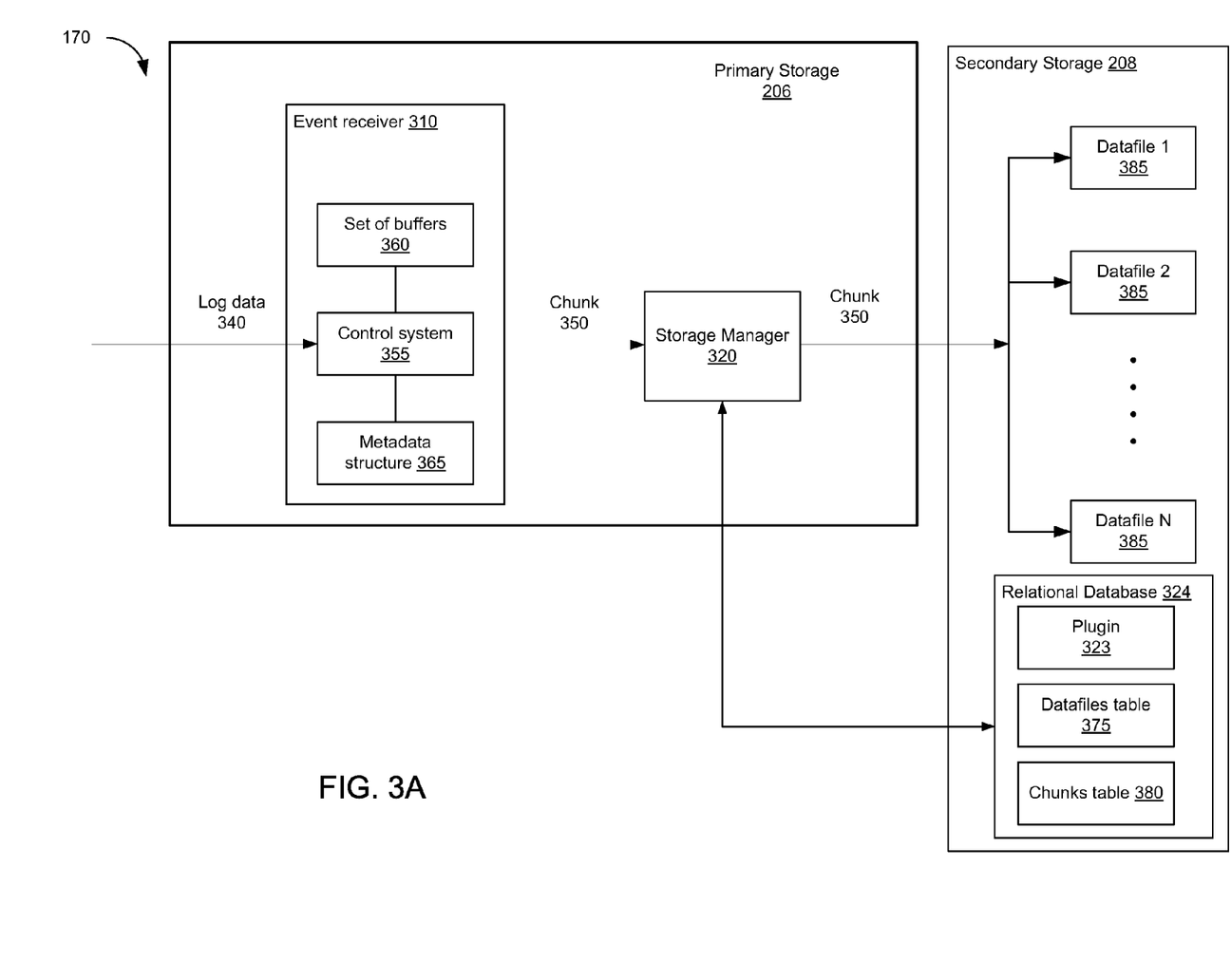
FIG. 3A is a block diagram illustrating components of a logging system associated with storing log data, according to one embodiment.

FIG. 3A is a block diagram illustrating components of a logging system 170 of a security information and event management (SIEM) system 100 associated with storing events, according to one embodiment. The primary storage 206 of the logging system 170 includes an event receiver 310, a storage manager 320, and a querying module 314 (illustrated in FIG. 3B). Although only one event receiver 310 is shown for clarity, the system 170 can support a large number of concurrent sessions with many event receivers 310. In one embodiment, each event receiver 310 is associated with a unique identifier. The secondary storage 208 receives chunk 350 and stores the chunk 350 in the datafile 385 of the secondary storage 208. The secondary storage 208 also stores the relational database 324.

The event receiver 310 receives log data 340, processes the log data 340, and outputs a data "chunk" 350. The event receiver 310 includes a control system 355, a set of one or more buffers 360, and a metadata structure 365. The control system 355 is communicatively coupled to the set of one or more buffers 360 and the metadata structure 365. The control system 355 controls the operation of the event receiver 310 and is further described below in detail with reference to FIG. 4.

Each buffer 360 stores information regarding one or more events. In one embodiment, a buffer's size is fixed but the size itself is configurable. If different events include the same types of fields, then the events can be organized in a table. Each row of the table would represent a different event, and each column of the table would represent a different field. In one embodiment, each buffer 360 is associated with a particular field and includes values from that field ("attributes") from one or more events. In another embodiment, each buffer 360 also includes an identifier ("IndexID") that indicates which field is associated with the buffer.

The metadata structure 365 stores metadata about the contents of the set of buffers 360. In one embodiment, this metadata includes the unique identifier associated with the event receiver 310 that received the events, the number of events in the set of buffers, and, for each of one or more "fields of interest," a minimum value and a maximum value that reflect the range of values of that field over all of the events in the set of buffers. The metadata structure 365 acts as a search index when querying event data.

In one embodiment, a field of interest is not an event field per se. Instead, it is a "derived" value that is determined based on the values stored in one or more fields of an event.

The storage manager 320 receives data chunks 350 and stores them in the secondary storage 208 so that they can be queried. In one embodiment, the storage manager 320 generates or extracts metadata of the chunk 350, and stores the metadata in chunks table 380 in the relational database 324. The chunks table 380 stores information about the metadata stored in the chunk (described below) and the location of the chunk (e.g., the unique identifier associated with the datafile that stores the chunk and the location within the datafile where the chunk is stored (e.g., as an offset)).

The storage manager 320 also generates datafiles table 375 for storing information about the one or more datafiles 385. The datafiles table 375 is also stored in the relational database 324. In one embodiment, each entry in the datafiles table 375 represents one datafile 385 for which space has been allocated, and the entry includes a unique identifier associated with the datafile and the location of the datafile (e.g., a file system, a path therein, and a file name). A datafile 385 listed in the datafiles table 375 may or may not contain data (e.g., chunks 350). In one embodiment, datafiles 385 are allocated before they are needed. In this embodiment, a list of these pre-allocated datafiles 385 (called a "free list") is maintained.

A datafile 385 stores multiple chunks 350. In one embodiment, all datafiles are the same size (e.g., 1 gigabyte) and are organized in time order.

The relational database 324 includes a plugin 323 that enables the relational database 324 to work in conjunction with executable components in the primary storage 206. In one embodiment, the relational database 324 is a commercially available database or open source database. The plugin 323 receives datafiles table 375 and the chunks table 380 and stores them so that these tables can be accessed during a query.

Figure 4:
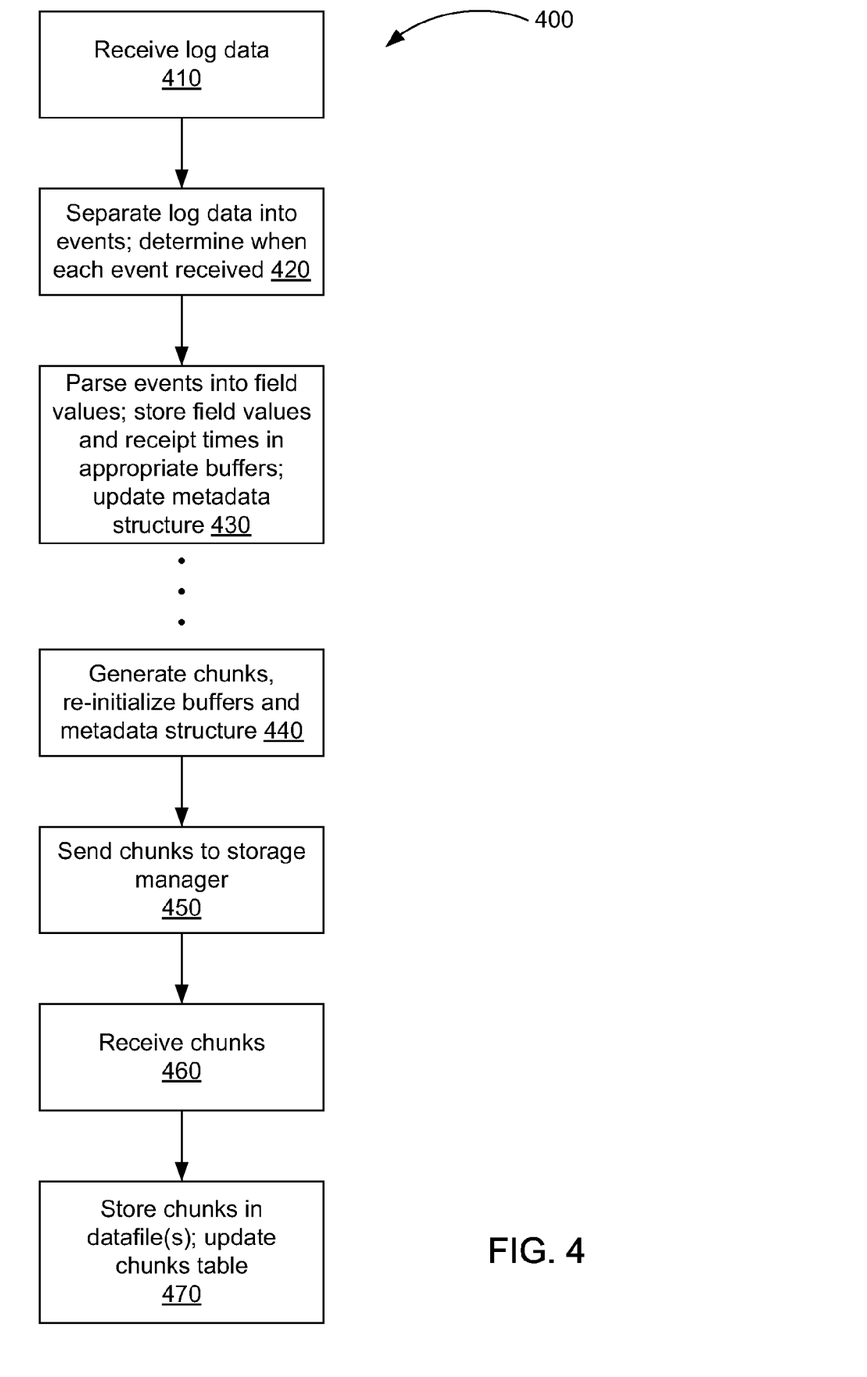
FIG. 4 is a flowchart illustrating a method for storing log data, according to one embodiment.

FIG. 4 is a flowchart illustrating a method for storing log data, according to one embodiment. In one embodiment, the method 400 of FIG. 4 is performed jointly by the event receiver 310 (e.g., its control system 355) and the storage manager 320.

In one embodiment, before the method 400 begins, the set of buffers 360 and the metadata structure 365 are initialized. For example, the control system 355 stores, in each buffer, the appropriate IndexID. The control system 355 also stores, in the metadata structure 365, the unique identifier associated with the event receiver 310.

The method 400 begins when the event receiver 310 receives 410 log data 340. In one embodiment, the log data 340 is received in the form of a stream.

The control system 355 separates 420 the log data into one or more events and determines 420 when each event was received by the event receiver 310.

The control system 355 parses 430 the events into their field values and stores the field values and receipt times in the appropriate buffers. The control system 355 also updates 430 the metadata structure 365. For example, the number of events in the buffer will have increased. The minimum and maximum values for the field(s) of interest may also need to be updated. In one embodiment, data write operations and metadata write operations are synchronized in order to avoid possible inconsistency if a system crash occurs. For example, a transactional database system is used so that if field values are stored in the buffer 360, the metadata structure 365 is guaranteed to be updated accordingly, even if the underlying system crashes in between the two steps.

At some point in time (see below), the control system 355 generates 440 data chunks 350 based on the metadata structure 365 and the contents of the buffers 360. For example, one chunk is generated for each buffer. Different chunks can have different sizes. Chunk sizes can differ due to, for example, the type of field values stored in a chunk (and the compression algorithm applied to them) and the type of trigger that caused the chunk to be generated. In one embodiment, a maximum chunk size can be specified.

In one embodiment, each chunk includes the metadata structure 365, the contents of the associated buffer, a chunk identifier (ChunkID), a stripe identifier (StripeID), and a set of index location identifiers (IndexLocationIDs). The field of interest, which concerns the meta-data portion of a chunk, and the field associated with the buffer, which concerns the "payload" portion of a chunk, need not be the same field. The ChunkID uniquely identifies the chunk with respect to other chunks. The StripeID, which is shared among the set of chunks, is used to associate the chunks with each other (since all of the chunks concern the same set of events). The next time the control system 355 generates 440 data chunks 350, the chunks will concern a different set of events, so a different StripeID will be used. The set of IndexLocationIDs includes one IndexLocationID for each field value in the buffer/chunk. The IndexLocationID is used to access a field value in a different chunk that corresponds to the same event. In one embodiment, the IndexLocationID includes the StripeID and an offset identifier (OffsetID). The OffsetID indicates which field value (within a buffer/chunk) corresponds to the desired event.

In one embodiment, the contents of the associated buffer 360 are compressed before they are stored in the chunk 350. Compressing the buffer contents makes this approach a cost-effective choice for long-term storage of data. The compressed version of the contents can be generated using any data compression algorithm.

In one embodiment, the chunk 350 also includes a "magic number" and a version identifier. The magic number, sometimes called a file signature, is a short sequence of bytes that identifies the data type of the chunk. For example, the magic number is reasonably unique (i.e., unique with a high probability) across other data and file formats, including other chunks. Thus, when a chunk is read, it is easy to determine whether the chunk is in the expected format. If the chunk's actual magic number differs from the expected magic number, then the chunk is "wrong" (e.g., corrupted). The magic number thereby helps detect data corruption and resynchronize data chunk boundaries in order to recover corrupt data. (If the actual magic number matches the expected magic number, then data that occurs later in the chunk might still be wrong. However, the matching magic number excludes this possibility for the majority of common situations.) The version identifier enables the accommodation of data and file formats that have changed. For example, when a chunk is read, the version identifier can be used in conjunction with the magic number to indicate additional information about the data or file format.

In another embodiment (also not shown), the control system 355 also generates a message digest of the contents of a buffer 360. For example, the control system 355 applies a cryptographic hash function to the bytes stored in the buffer 360. Any cryptographic hash function can be used, such as Message-Digest algorithm 5 (MD5) or an algorithm in the Secure Hash Algorithm family (e.g., SHA-256). In one embodiment, the digest value is stored in the chunk 350. This value can later be used to determine whether the buffer data that is stored in the chunk (in compressed form) has been changed or tampered with. This helps guarantee the integrity of stored events by making it noticeable when events have been changed. Also, when the chunk 350 arrives at the storage manager 320, the digest value can be stored in the chunks table 380 along with the chunk's metadata. That way, if the chunk is later tampered with (or corrupted) while it is stored in a datafile 385, the message digest of the tampered chunk will not match the message digest that was previously stored in the chunks table 380.

The set of buffers 360 and the metadata structure 365 are then re-initialized 440, thereby flushing the buffers 360. In one embodiment, the set of buffers 360 includes additional buffers that can be used to store incoming events while other buffers are full or are being flushed.

In one embodiment, step 440 is performed ("triggered") when any one of the buffers 360 is full. In another embodiment, step 440 is performed (triggered) when a particular period of time (a "timeout window") has elapsed, during which no events were received by the event receiver 310.

The control system 355 sends 450 the data chunks 350 to the storage manager 320. The storage manager 320 receives 460 the chunks 350 and stores 470 the chunks in one or more datafiles 385 (see below). In one embodiment, a chunk is encrypted before it is stored for security purposes. The storage manager 320 also updates 470 the chunks table 380. For example, the storage manager 320 adds to the table information regarding the chunks 350 that it just stored in the datafile(s) 385.

After a chunk 350 has been stored in a datafile 385, the field values within the chunk can be queried. A query can be executed by itself or as part of handling an interactive search or generating a report. A query is represented as an expression that can be evaluated against an event. The expression includes one or more search operators. A search operator concerns the contents of an event, such as, a particular field and the value of that field.

Figure 3B:
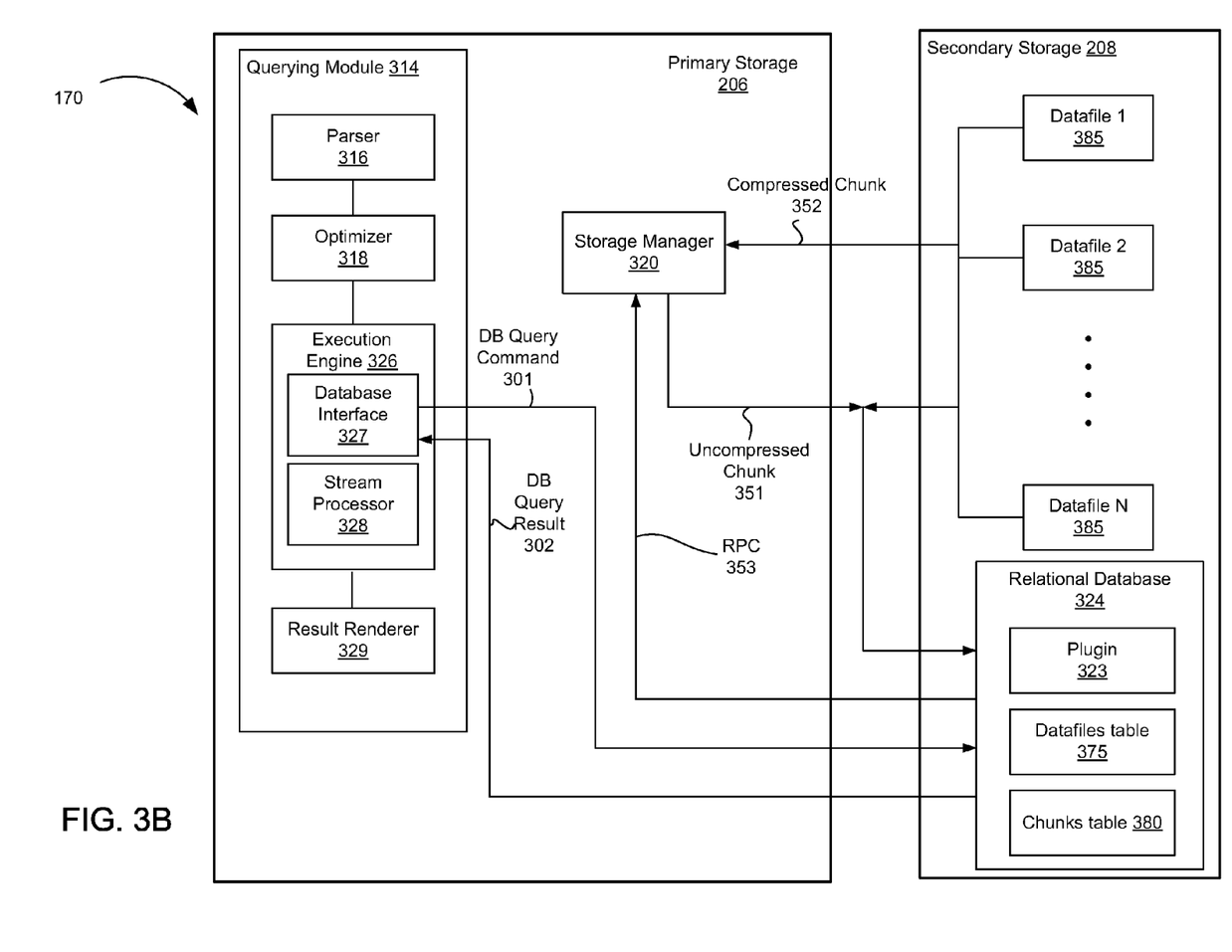
FIG. 3B is a block diagram illustrating components of a logging system associated with performing query operations on the stored log data, according to one embodiment.

FIG. 3B is a block diagram illustrating components of the logging system 170 associated with querying, according to one embodiment. The components of the logging system 170 for querying include, among others, a querying module 314, a relational database 324 and the secondary storage device 208. The querying module 314 is stored and operates on the primary storage 206. The relational database 324 is stored on the secondary storage 208. The secondary storage device 208 includes multiple datafiles 385 (created during the storage stage) and the relational database 324, as described above in detail with reference to FIGS. 3A and 4. The primary storage 206 and the secondary storage 208 communicate data via the bus 204 or other communication channels.

The querying module 314 includes, among other components, a parser 316, an optimizer 318, an execution engine 326 and a result renderer 329. The parser 316 receives a query request and parses the request to identify query operators. In one embodiment, a query request includes multiple query operators and a separator for distinguishing the query operators. The separator may be the ASCII vertical bar character "|". An example query request is as follows:

EXAMPLE (1)

failed login time="the last two hours"|rex "extract srcIP"|top srcIP|head 5

The above query request includes four separate query operators. The first operator "failed login time='the last two hours'" indicates search for 'failed login" attempts for last two hours at a specified event source. The vertical bar character "|" following the first operator indicates that the first operator is finished and a string of characters related to a second operator will follow. The second operator (rex "extract srcIP") is a regular expression for extracting a first value (here, source IP addresses) from events obtained by the first operator (here, failed login attempts that occurred during the last two hours). The second operator is followed by another vertical bar character "|" to separate the second operator from the third operator. The third operator ("top srcIP") operator sorts matching entries by a field in the event (in this case, source IP address) by matching counts. The result of the "top" operator is a table with two columns: the first column including source IP addresses, and the second column indicating event count (representing a number of failed login attempt events from that source IP address). The third operator is followed by another vertical bar character "|" to separate the third operator from the fourth operator. Finally, the fourth operator ("head 5") determines top 5 results from the matching events.

The parser 316 parses the query request and converts the query request into a query pipeline of multiple query operators. A query pipeline herein refers to a set of multiple query operations for processing in a sequential order. The result of a query operation in the query pipeline is provided to a subsequent query operation in the query pipeline. After undergoing all operations in sequence, the final query result is obtained from the last query operation.

In one embodiment, the parser 316 identifies the user name of the query request and modifies the query pipeline to limit the results based on access granted to the user. For example, if the user "joe" is allowed to access only a certain type of events based on regular expression, a new operator "regex 'joe access regular expression'" is added between the first operator and the second operator in the above example (1) to limit the expression that the user 'joe' is allowed to access.

In one embodiment, the query pipeline generated by the parser 316 is provided to the optimizer 318 to rearrange, eliminate, or rewrite the operators in the query pipeline to render the query pipeline more efficient or amendable to query operations. In one example, the optimizer 318 moves the positions of the operators within the query pipeline in order to achieve better performance. For example, a query "failed login|cef srcIP|regex 'magic regex expression'|cef dst|top dst" may be rearranged to "failed login|cef srcIP dst|regex 'magic regex expression'|top dst". CEF is an open log management standard that improves the interoperability of security-related information from different security and network devices and applications. "cef" operator extracts a field value from a CEF compliant event. "cef" operator may use extensive resources since the entire event needs to be parsed. The modified query pipeline performs parsing only once instead of twice. In one embodiment, optimization may be performed by relocating "cef" operator inside first query operator. The modified query would read as "failed login (cef srcIP dst)|regex 'magic regex expression'|top dst." In this case, the expensive cef parsing is completely eliminated.

The optimizer 318 may also eliminate operators that are not required. For example, in the query request "failed login|cef srcIP|cef dst|top dst," the results list events sharing the same values in the "dst" fields. The "cef srcIP" operator is not relevant in this query pipeline because the results depend on values in "dst" field and not on values in "srcIP" field. Hence, the optimizer 318 removes the "cef srcIP" operator and updates the query pipeline to "failed login|cef dst|top dst". The updated query pipeline does not include the "cef srcIP" operator.

The optimizer 318 may also rewrite one or more pipeline operators into a more efficient form. For example, in the query request "failed login|cef srcIP|chart_count by srcIP|sort-srcIP," chart_count and sort operators may be combined into a single "top" operator. The chart_count operator generates a chart indicating the number of occurrences of certain entry value representing a criterion (e.g., the source IP address). The sort operator sorts the entries in the chart based on a certain criterion (e.g., the source IP address). The "top" operator is a single operator that performs the operation of the chart_count operator and the sort operator. Hence, the optimizer 318 rewrites the query request to "failed login|cef srcIP|top srcIP."

The optimized query pipeline is then fed to the execution engine 326. The execution engine 326 includes, among others, a database interface 327 and a stream processor 328. A first set of operators is predefined for searching using the relational database 324, and a second set of operators is predefined for processing by the stream processor 328 or the database interface 327. The database interface 327 converts any of the first operators (that uses the relational database 324) into a database query command (e.g., SQL command). The database query command is then forwarded to the relational database 324 to perform a querying operation. In contrast, the second set of operators is forwarded to the stream processor 328 for stream processing. In example (1), the query operators "failed login" and "top" are better suited for processing by the relational database 324, while other query operators are all processed by the stream processor 328. Any operators that are likely to consume a large amount of memory and operators configured for efficient performance on a relational database are performed using the relational database, whereas other operations are performed using stream processing.

Example operators and details of the operators are "chart," "where," "rare" and "top" operators which may be used for operations on the relational database 324. Conversely "cef," "eval," "fields," "head," "regex," "rex," "sort," "tail," "rename," "replace," "extract," and "keys" operators are processed at the stream processor 328.

The execution engine 326 executes a series of query operations according to the query pipeline as received from the optimizer 318. For example, the execution engine 326 performs a series of query operations corresponding to the query operators in a sequence as defined in the query pipeline.

The first operator in the query pipeline is called a query source. A query source generates multiple matching data entries and uses accesses to the relational database 324. In the above example (1), the query source is "failed login." Following the query source are supporting operators. The supporting operators include at least two types of query operators. One is a single event operator and another is an aggregated event operator. When executed, a single event operator takes one event, processes the event, and outputs a processed event or nothing. In contrast, an aggregated event operator takes multiple events and outputs the summary of the multiple events. In the above example (1), "rex" operator is a single event operator, whereas "top" operator and "head" operator are aggregated event operators.

A query pipeline may include operators accessing the relational database 324 as support operators. Some operators are more efficient or reliable when performed using the relational database 324 even though it is possible to perform these operations by stream processing. If an operator results in a large number of result sets, such an operator may take up excessive memory space; and hence, may be inappropriate for stream processing. Further, relational databases are very efficient at performing operations such as "top," "join," "sub-query," "set" operations and various indexing operations.

Hence, such operations are performed using the relational database 324 instead of stream processing. By using the relational database to perform such query operations, the querying module 314 can provide higher performance and scalability.

To perform a search using the relational database 324, the database interface 327 sends a database query command 301 to the relational database via the plugin 323. The relational database 324 may need to issue a RPC (remote procedure call) 353 to the storage manager 320 (or other components) in the logging system 170 via the plugin 323 to identify the datafile table 375 or the chunks table 380 relevant to a query command 301. If so, the relational database 324 receives a response (not shown) to the RPC 353 from the storage manager 320 or other components that enables the relational database 324 to retrieve relevant chunks 351, 352 directly or via other components.

In one embodiment, the storage manager 320 manages metadata associated with the chunks stored in the datafiles 385. After receiving the query command 301 from the database interface 327, the relational database 324 issues a RPC 353 to the storage manager 320. The storage manager 320 decides if all the data chunks relevant to the query command 301 are indexed in chunks table 380 by making a query to the relational database 324 to search the chunks table 380. If all relevant data chunks are indexed, the storage manager 320 identifies relevant metadata entries by performing search on the chunks table 380, and sends the identified metadata entries to the relational database 324.

In one embodiment, the querying operation on the relational database 324 is performed in multiple phases. If at least some relevant data chunks are not indexed (determined by determining presence of corresponding entries in the chunks tables 380), the storage manager 320 accesses chunks in the datafiles 385 to identify relevant events using the datafiles table 375. The storage manager 320 retrieves compressed chunk 352 including relevant events from the datafiles 385, decompresses the chunk 352, and sends the decompressed chunk 351 or selected events to the relational database 324. The relational database 324 performs further processes based on the query command, and sends the database query result 302 to the database interface 327. The database query result 302 then becomes the basis of further downstream query operations at the execution engine 326.

In one embodiment, the relational database 324 performs querying operations without issuing a RPC 353 to the storage manager 320. In this embodiment, the relational database 324 accesses the datafiles tables 375 and/or the chunks table 380 directly, reads compressed chunks 352 directly from the datafiles 385 and uncompresses the chunk before processing, as needed.

For each operation in the query pipeline for stream processing, the stream processor 328 creates a stream process instance and executes corresponding query operations. The stream process instance does not make any queries to the relational database 324 and is performed using memory space of the primary storage 206. The processed result from a stream process instance corresponding to a query operator is fed to a subsequent stream process instance corresponding to a subsequent query operator in the query pipeline.

Some stream process instances can perform operations based on partial results. For such stream process instances, the stream processing can be performed in parallel by executing multiple stream process instances simultaneously. A first stream process instance earlier in the pipeline receives input, processes the input and sends the processed result to a second stream process instance following the first stream process instance. If the second stream process instance is a single event operator, the second stream process instance executes and outputs data as each processed event is received from the first stream process instance. If the second stream process is an aggregated event operator, the second stream process executes and outputs a result after receiving multiple processed events from the first stream process instance.

The result renderer 329 receives the query result from the execution engine 326. The result renderer 329 then processes the query result for transmission or display and sends to a user device.

Figure 5:
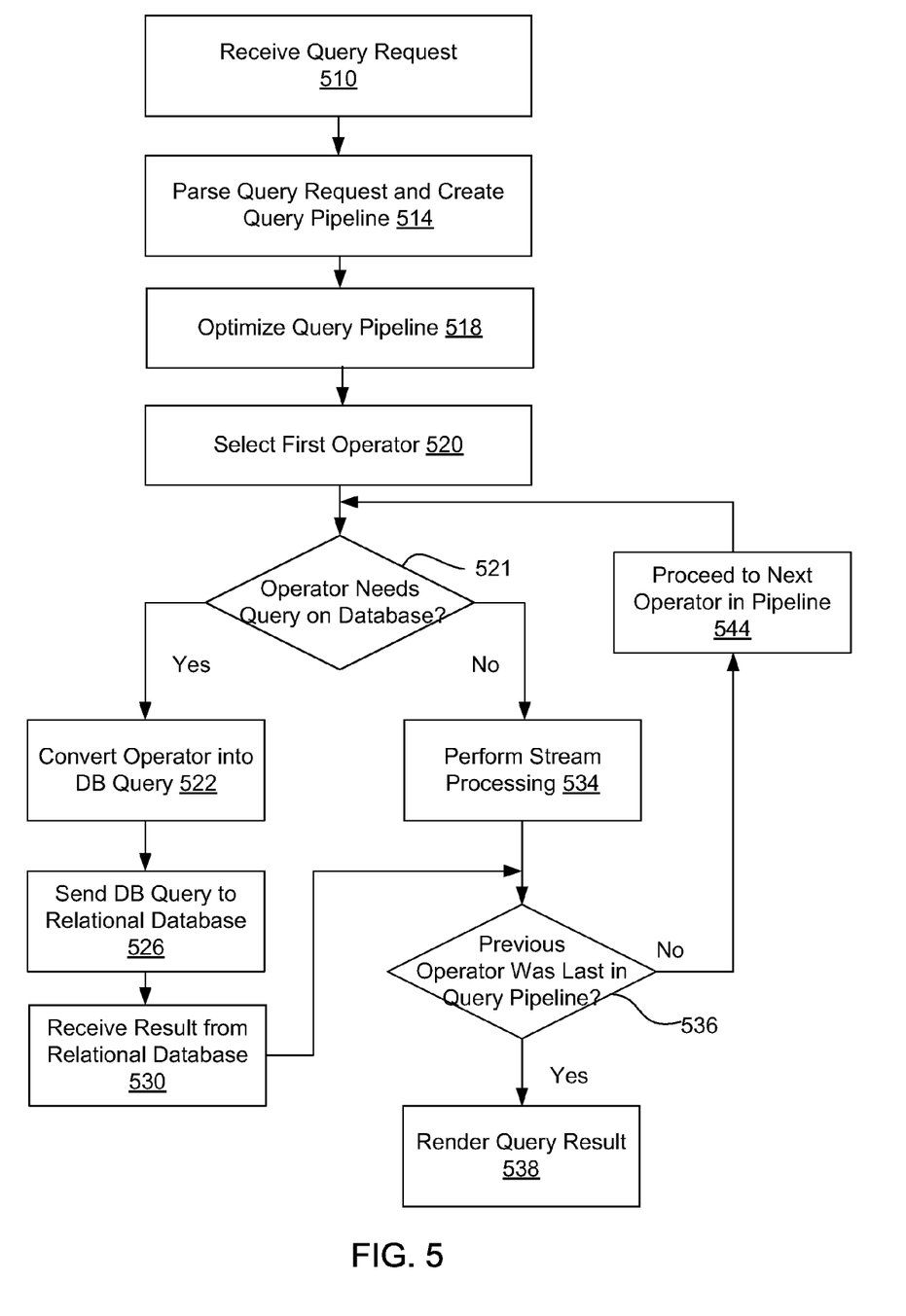
FIG. 5 is a flowchart illustrating a method for querying the stored log data, according to one embodiment.

FIG. 5 is a flowchart illustrating a method for querying, according to one embodiment. First, the parser 316 receives 510 the query request. The parser 316 parses 514 the query request and determines the query operators included in the query request. As a result, the parser 316 creates 514 a query pipeline. The optimizer 318 then optimizes 518 the created query pipeline by removing, rewriting, or rearranging the query operators in the query pipeline.

The execution engine 326 then selects 520 the first operator in the query pipeline. Then, the execution engine 326 determines 521 whether the first operator is to be used for a query on the relational database 324. If the first operator is for querying the relational database 324, then the database interface 327 of the execution engine 326 converts 522 the query operator into a database query command 522 and sends 526 the database query command 301 to the relational database 324. The relational database 324 performs operations according to the database query command and returns the DB query result 302 to the database interface 327.

The first query operator performs query on the relational database 324 using the database interface 327. It is then determined 536 if the first operator is the last query operator in the query pipeline. By definition, there is at least one other query operator in the query pipeline; and hence, the method proceeds 544 to the next operator in the query pipeline. After proceeding to the next query operator, the process of determining whether the query operator needs a query on the relational database 324 and subsequent steps are repeated.

If it is determined that the 521 that a query may be performed by stream processing, the stream processing is performed 534 at the stream processor 328.

For stream processing, multiple stream processing instances may be created for simultaneous operations. A pipeline of stream processing instances may be created so that the result from a stream processing instance is fed to a subsequent stream processing instance. In this way, the stream processing can be performed more efficiently and promptly. Stream processing may include executing operations on the primary memory device outside of the secondary storage device.

If it is determined 521 that the next query operator needs a query on the relational database 324, the database interface 327 converts 522 the query operator into a database query command 301. The database query command 301 is then sent 526 to the relational database 324. The query is executed on the relational database 324, and the querying module 314 receives 530 the database query result 302 of the query from the relational database 324. Then the process proceeds to determine 536 if the previous operator was the last operator in the query pipeline, and reiterates the subsequent processes.

If it is determined 536 that the previous query operator was the last query operator in the query pipeline, then the execution engine 326 sends the query result to the result render 329. Then, the result renderer 329 processes 538 the query result for transmission or display to the user.

In one embodiment, the execution engine provides partial query results to the result renderer 329. This enables some results to be displayed to the user before the entire query operations have been performed.

The sequence and steps described above with reference to FIG. 5 are merely illustrative. For example, in cases where the query operators are already in the format of a database query command, step 522 may be omitted. Moreover, step 518 of optimizing the query pipeline may also be omitted.

What is claimed is:

1. A method of generating a query pipeline in a logging system comprising:
 parsing received log data into data chunks;
 storing the data chunks in a storage;
 generating metadata of the data chunks stored in the storage and storing the metadata in a database;
 receiving a query request;
 determining query operations based on the query request;
 creating, by a processor, a query pipeline including the query operations based on the query request, wherein the query operations include a first query operator and a second query operator to perform a first query operation and a second query operation, wherein a result from the first query operation in the query pipeline is fed to the second query operation in the query pipeline;
 identifying a username in the query request to determine a level of access of a user;
 modifying the query pipeline, including adding a new operator between the first query operator and the second query operator to limit results from the query pipeline based on the determined level of access of the user;
 optimizing, by the processor, the modified query pipeline including at least one of: rearranging the query operators in the query pipeline, eliminating an operator from the query pipeline, or combining multiple operators in the query pipeline into a single operator; and
 processing the query operations in the optimized query pipeline to obtain query results from the metadata in the database and the data chunks in the storage.

2. The method of claim 1, comprising:
 dividing the query request into a sequence of query operators including the first query operator and the second query operator, wherein the first query operator relates to executing the first query operation on the database in a secondary storage device, and the second query operator relates to executing the second query operation on data in a primary memory device.

3. The method of claim 2, comprising:
 selecting the first query operation to be performed on the database based on amount of consumption of memory when executing the first query operation on the database.

4. The method of claim 2, comprising:
 loading a result of the first query operation obtained from the database in the primary memory device; and
 performing the second query operation according to the second operator on the loaded result in the primary memory device.

5. The method of claim 4, wherein performing the second query operation comprises:
 executing the second query operation in the primary memory device without accessing the secondary storage device.

6. The method of claim 1, wherein parsing a received log data into data chunks comprises:
 receiving log data;
 separating log data into events;
 parsing events into field values;
 storing the field values and receipt times in a buffer; and
 updating a metadata structure storing metadata for the events.

7. The method of claim 6, wherein parsing a received log data into data chunks further comprises:
 generating, based on the metadata, the data chunks from the field values in the buffer; and
 sending the data chunks to store in the storage.

8. The method of claim 7, wherein each data chunk includes a unique chunk ID identifying the data chunk, a stripe ID shared among a set of data chunks, and an index local identifier for each field value in the data chunks.

9. The method of claim 7, comprising:
 updating a chunk table identifying the data chunks stored in a datafile for the storage, wherein the chunk table is used to retrieve the data chunks from the datafile for the storage if the data chunks are included in results of the query operations.

10. The method of claim 9, comprising:
 determining whether all data chunks relevant to the results are indexed in the chunk table;
 if all data chunks relevant to the results are not indexed in the chunk table, identifying relevant events from a datafile for the storage, retrieving data chunks for the relevant events from the datafile, and sending the retrieved chunks to the storage.

11. A logging system comprising:
 a processor to parse received log data into data chunks, store the data chunks in a storage, generate metadata of the data chunks stored in the storage and store the metadata in a database, receive a query request, create a query pipeline including query operations based on the query request, wherein the query operations include a first query operator and a second query operator to perform a first query operation and a second query operation, identify a username in the query request to determine a level of access of a user; modify the query pipeline by adding a new operator between the first query operator and the second query operator to limit results from the query pipeline based on the determined level of access of the user, optimize the modified query pipeline including at least one of: rearranging the query operators in the query pipeline, eliminating an operator from the query pipeline, and combining multiple operators in the query pipeline into a single operator, process the query operations in the optimized query pipeline to obtain query results from the metadata in the database and the data chunks in the storage,
 wherein a result from the first query operation in the query pipeline is fed to the second query operation in the query pipeline.

12. The system of claim 11, wherein the processor is to divide the query request into a sequence of query operators including the first query operator and the second operator, wherein the first query operator relates to executing the first query operation on the database-in a secondary storage device, and the second query operator relates to executing the second query operation on data in a primary memory device.

13. A non-transitory computer readable medium storing machine readable instructions that when executed by a processor perform a method comprising:
 parsing received log data into data chunks;
 storing the data chunks in a storage;
 generating metadata of the data chunks stored in the storage and storing the metadata in a relational database;
 receiving a query request;
 creating a query pipeline including query operations based on the query request, wherein the query operations include a first query operator and a second query operator to perform a first query operation and a second query operation, wherein a result from the first query operation in the query pipeline is fed to the second query operation in the query pipeline;

identifying a username in the query request to determine a level of access of a user;

modifying the query pipeline by adding a new operator between the first query operator and the second query operator to limit results from the query pipeline based on the determined level of access of the user;

optimizing the modified query pipeline, including at least one of: rearranging the query operators in the query pipeline, eliminating an operator from the query pipeline, and combining multiple operators in the query pipeline into a single operator; and processing the query operations in the optimized query pipeline to obtain query results from the metadata in the database and the data chunks in the storage.

14. The non-transitory computer readable medium of claim 13, wherein the method comprises:

dividing the query request into a sequence of query operators including the first query operator and the second query operator, wherein the first query operator relates to executing the first query operation on the database in a secondary storage device, and the second query operator relates to executing the second query operation on data in a primary memory device.

* * * * *